(12) United States Patent
Mohammad

(10) Patent No.: US 12,182,056 B1
(45) Date of Patent: Dec. 31, 2024

(54) MULTI LEVEL LOOPBACK TO ENABLE AUTOMATED TESTING OF STANDALONE CONNECTIVITY CONTROLLER

(71) Applicant: Synopsys, Inc., Sunnyvale, CA (US)

(72) Inventor: Saleem Chisty Mohammad, Fremont, CA (US)

(73) Assignee: Synopsys, Inc., Sunnyvale, CA (US)

( * ) Notice: Subject to any disclaimer, the term of this patent is extended or adjusted under 35 U.S.C. 154(b) by 18 days.

(21) Appl. No.: 18/134,419

(22) Filed: Apr. 13, 2023

(51) Int. Cl.
*G06F 13/10* (2006.01)
*G06F 11/22* (2006.01)
*G06F 13/42* (2006.01)

(52) U.S. Cl.
CPC ........ *G06F 13/4282* (2013.01); *G06F 11/221* (2013.01)

(58) Field of Classification Search
CPC .......................... G06F 13/4282; G96F 11/221
See application file for complete search history.

(56) References Cited

U.S. PATENT DOCUMENTS

| | | | | |
|---|---|---|---|---|
| 7,299,389 B2 * | 11/2007 | Nishida | .......... | G01R 31/318572 714/724 |
| 7,310,754 B2 * | 12/2007 | Nishida | ............ | G01R 31/31723 714/724 |
| 8,135,872 B2 * | 3/2012 | Sakaguchi | ............ | G06F 13/385 714/716 |
| 9,026,854 B2 * | 5/2015 | Jeong | .................... | G11C 29/022 714/30 |
| 9,897,650 B2 * | 2/2018 | Na | .................... | G01R 31/31716 |
| 10,041,999 B2 * | 8/2018 | Chen | .................. | G01R 31/3177 |
| 10,554,348 B2 * | 2/2020 | Kobayashi | ............ | G06F 13/385 |
| 11,977,464 B2 * | 5/2024 | Sunayama | .......... | G06F 11/3075 |
| 2004/0205416 A1 * | 10/2004 | Shirota | .................... | H04L 43/50 714/48 |
| 2008/0159157 A1 * | 7/2008 | Nair | ...................... | G06F 13/385 370/252 |
| 2008/0163012 A1 * | 7/2008 | Nair | ...................... | G11C 29/56 714/716 |
| 2013/0018624 A1 * | 1/2013 | Bhatnagar | .............. | G01R 31/58 702/119 |
| 2015/0269102 A1 * | 9/2015 | Inha | .................... | G06F 13/4022 710/316 |

FOREIGN PATENT DOCUMENTS

| | | | | |
|---|---|---|---|---|
| JP | 2005165834 A | * | 6/2005 | |
| WO | WO-2007010452 A2 | * | 1/2007 | ....... G01R 31/31725 |
| WO | WO-2008082553 A2 | * | 7/2008 | ............ G06F 11/221 |

* cited by examiner

*Primary Examiner* — Cheng Yuan Tseng
(74) *Attorney, Agent, or Firm* — Weaver Austin Villeneuve & Sampson LLP

(57) ABSTRACT

A method of testing a connectivity controller includes, in part, setting a configuration register disposed in the connectivity controller to a first value; causing a first data stored in a first section of a memory associated with the connectivity controller to be forwarded and pass through at least a first component of the connectivity controller and a second component of the connectivity controller, in sequence, in response to the first value; returning data received by the second component, via the first component, for storage in a second section of the memory; comparing, by a processor, the first data to the data returned and stored in the second section of the memory; and verifying the test if the first data matches the returned data.

20 Claims, 15 Drawing Sheets

US 12,182,056 B1

MULTI LEVEL LOOPBACK TO ENABLE AUTOMATED TESTING OF STANDALONE CONNECTIVITY CONTROLLER

TECHNICAL FIELD

The present application relates to a connectivity controller, and more particularly to multi-level loopback to enable automated testing of a standalone universal serial bus (USB) controller.

BACKGROUND

There has been a rapid and widespread increase in the development of communication and computation technologies, particularly in the capabilities of mobile electronic devices to connect and communicate with each other using a number of different communication protocols and connectors.

Examples of connector or interface technology, such as the universal serial bus (USB), provide data or power to a computing or a communication device. Particular versions of connector technology, such as USB-C and USB4, are able to provide signals of various types, such as command, data, and power, to computing and communication devices.

SUMMARY

A method of testing a connectivity controller, in accordance with one embodiment of the present disclosure, includes, in part, setting a configuration register disposed in the connectivity controller to a first value; causing a first data stored in a first section of a memory associated with the connectivity controller to be forwarded and pass through at least a first component of the connectivity controller and a second component of the connectivity controller, in sequence, in response to the first value; returning data received by the second component, via the first component, for storage in a second section of the memory; comparing, by a processor, the first data to the data returned and stored in the second section of the memory; and verifying the test if the first data matches the returned data.

In one embodiment, the connectivity controller is a Universal Serial Bus 4 (USB4) host controller. In another embodiment, the connectivity controller is a USB4 device controller. In one embodiment, the USB4 controller is configured to process both USB3 generation T packets and USB3 generation X packets. In one embodiment, the first component is a USB3 media access controller. In one embodiment, the second component is a USB3 link controller. In one embodiment, the USB4 controller includes, in part, a Peripheral Component Interconnect Express (PCIe) controller.

In one embodiment, the method further includes, in part, setting the configuration register to a second value; causing a second data stored in the first section of the first memory to be forwarded to a physical access layer (PHY) of the USB4 controller; returning data from the PHY for storage in the second section of the memory; comparing the second data to the data returned from the PHY and stored in the second section of the memory; and verifying the test if the second data matches the data returned from the PHY. In one embodiment, the method further includes, in part, setting a direction bit of a packet represented by the first data to a first logic level; and setting a direction bit of a packet represented by the returned data to a second logic level.

A system, in accordance with one embodiment of the present disclosure, includes, in part, a memory storing instructions; and a processor, coupled with the memory and configured to execute the instructions thus causing the processor to: set a configuration register disposed in a connectivity controller to a first value; cause a first data stored in a first section of a memory associated with the connectivity controller to be forwarded and pass through at least a first component of the connectivity controller and a second component of the connectivity controller, in sequence, in response to the first value; return data received by the second component, via the first component, for storage in a second section of the memory; compare the first data to the data returned and stored in the second section of the memory; and verify the test if the first data matches the return data.

In one embodiment, the connectivity controller is one or more of a USB4 host controller and a USB4 device controller. In one embodiment, the USB4 controller is configured to process both USB3 generation T packets and USB3 generation X packets. In one embodiment, the first component is a USB3 media access controller. In one embodiment, the second component is a USB3 link controller. In one embodiment, the USB4 controller includes, in part, a Peripheral Component Interconnect Express (PCIe) controller.

In one embodiment, the instruction further cause the processor to: set the configuration register to a second value; cause a second data stored in the first section of the first memory to be forwarded to a physical access layer (PHY) of the USB4 controller; return data from the PHY for storage in the second section of the memory; compare the second data to the data returned from the PHY and stored in the second section of the memory; and verify the test if the second data matches the data returned from the PHY. In one embodiment, the instruction further cause the processor to: set a direction bit of a packet represented by the first data to a first logic level; and set a direction bit of a packet represented by the second data to a second logic level.

A non-transitory computer readable medium includes stored instructions, which when executed by a processor, cause the processor to: set a configuration register disposed in a USB4 controller to a first value; cause a first data stored in a first section of a memory associated with the USB4 controller to be forwarded and pass through at least a first component of the USB4 controller and a second component of the USB4 controller, in sequence, in response to the first value; return data received by the second component, via the first component, for storage in a second section of the memory; compare the first data to the data returned and stored in the second section of the memory; and verify the test if the first data matches the return data.

In one embodiment, the USB4 controller is one or more of a USB4 host controller and a USB4 device controller. In one embodiment, the USB4 controller is configured to process both USB3 generation T packets and USB3 generation X packets. In one embodiment, the instructions further cause the processor: set a direction bit of a packet represented by the first data to a first logic level; and set a direction bit of a packet represented by the returned data to a second logic level.

DRAWINGS

The disclosure will be understood more fully from the detailed description given below and from the accompanying figures of embodiments of the disclosure. The figures are used to provide knowledge and understanding of embodi- FIGS. 1A and 1B are a schematic diagram of a USB4 host controller connected to a USB4 device controller via a USB type-C connector, in accordance with one embodiment of the present disclosure.

DETAILED DESCRIPTION

Figure 1A:
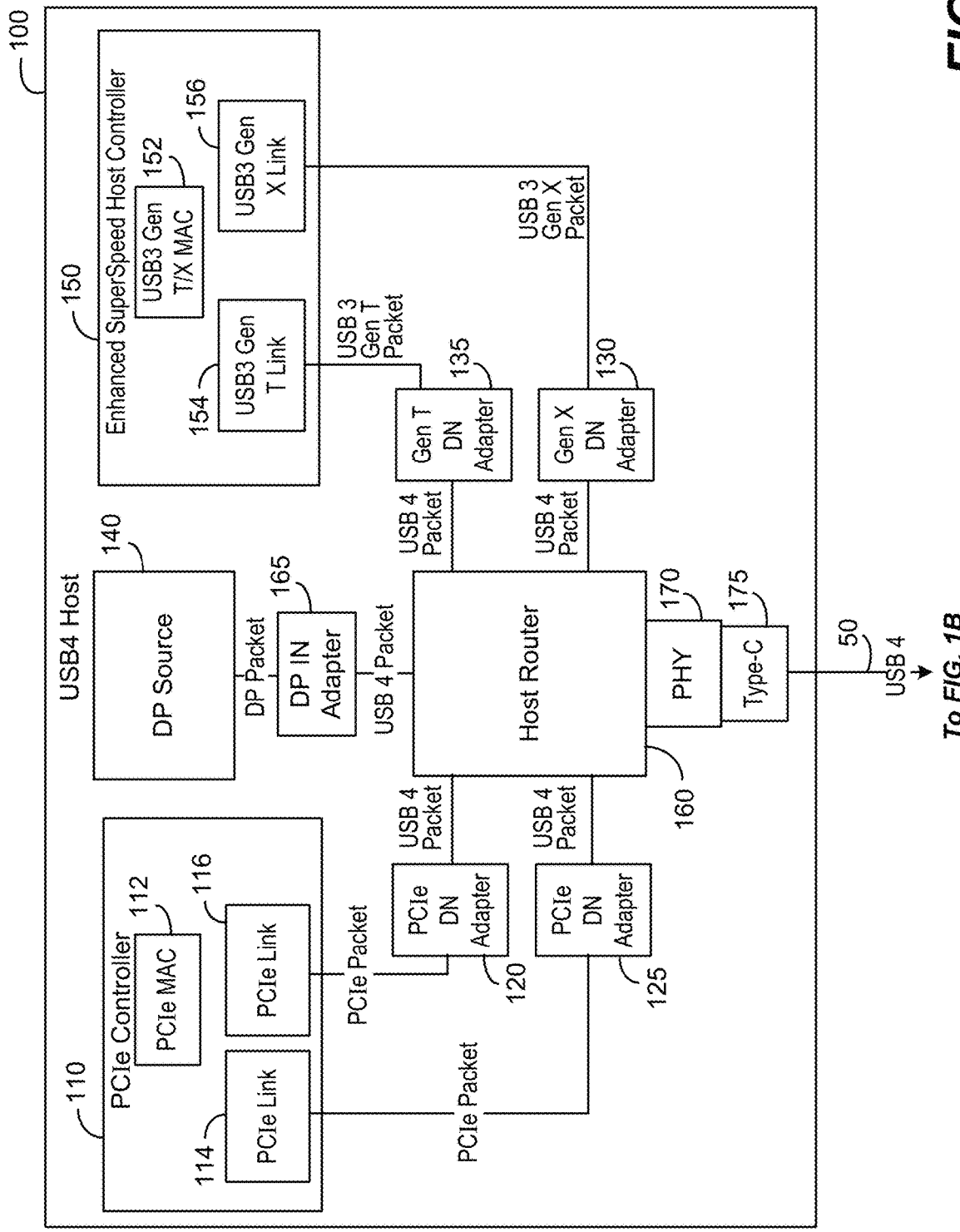

Aspects of the present disclosure relate to providing multi-level loopback to enable automated testing of a stand-alone USB controller.

Integrated circuits (ICs) may be tested before being shipped. Such tests often involve verifying the electrical characteristics of the IC. When the IC is designed according to a protocol/standard, such as the USB4 standard, the IC is tested to ensure it operates in conformity with the protocol.

Manual testing of ICs may be practiced when it involves a relatively small number of the ICs. For example, when the IC is designed to conform to the USB4 protocol and includes a USB4 device controller, it may be tested in a lab by connecting the USB4 device controller to a USB4 host controller, and ensuring, among other tests, that the data transferred from the USB4 device controller (or the USB4 host controller) is received at the USB4 host controller (or the USB4 device controller) without error, and in accordance with the USB4 protocol.

Testing of a USB4 host or device as is typically performed, therefore, requires both a USB4 host and a USB4 device, and is thus time consuming and laborious. If the testing of the USB4 host or a USB4 device is to be carried out at scale and at commercial volumes, the testing becomes prohibitively expensive and time consuming.

According to one embodiment, the present disclosure describes testing a connectivity controller, such as a USB4 device controller or a USB4 host controller, as a standalone device. Accordingly, a connectivity controller, in accordance with embodiments of the present disclosure, is not required to be connected to another connectivity controller in order to be tested. For example, when the connectivity controller is a USB4 device controller, the USB4 device controller is tested without being connected to a USB4 host controller. Similarly, when the connectivity controller is a USB4 host controller, the USB4 host controller is tested without being connected to a USB4 device controller. The following description of the embodiments of the present disclosure is provided with reference to a USB4 device controller and a USB4 host controller. It is understood however, that embodiments of the present disclosure are not so limited and equally apply to any other connectivity controller.

Technical advantages of the present disclosure include, but are not limited to, enhancing the speed and efficiency of testing and verifying the functionality of a connectivity controller, such as the USB4 host and device controllers, and enabling the data loopback, defined further below, to be carried out across any one of a number of components (e.g., PHY, device router, adapter) of the connectivity controller. The present system and method substantially reduces time and cost in testing of a connectivity controller, such as the USB4 host and/or device controller, by dispensing the need to connect a USB4 host to a USB4 device during such a test, as is commonly practiced. Although the present disclosure is described with respect to USB4 controllers, it is appreciated that the present disclosure may apply to any connectivity controller, USB or otherwise, without deviating from the scope of the present disclosure.

Figure 1B:
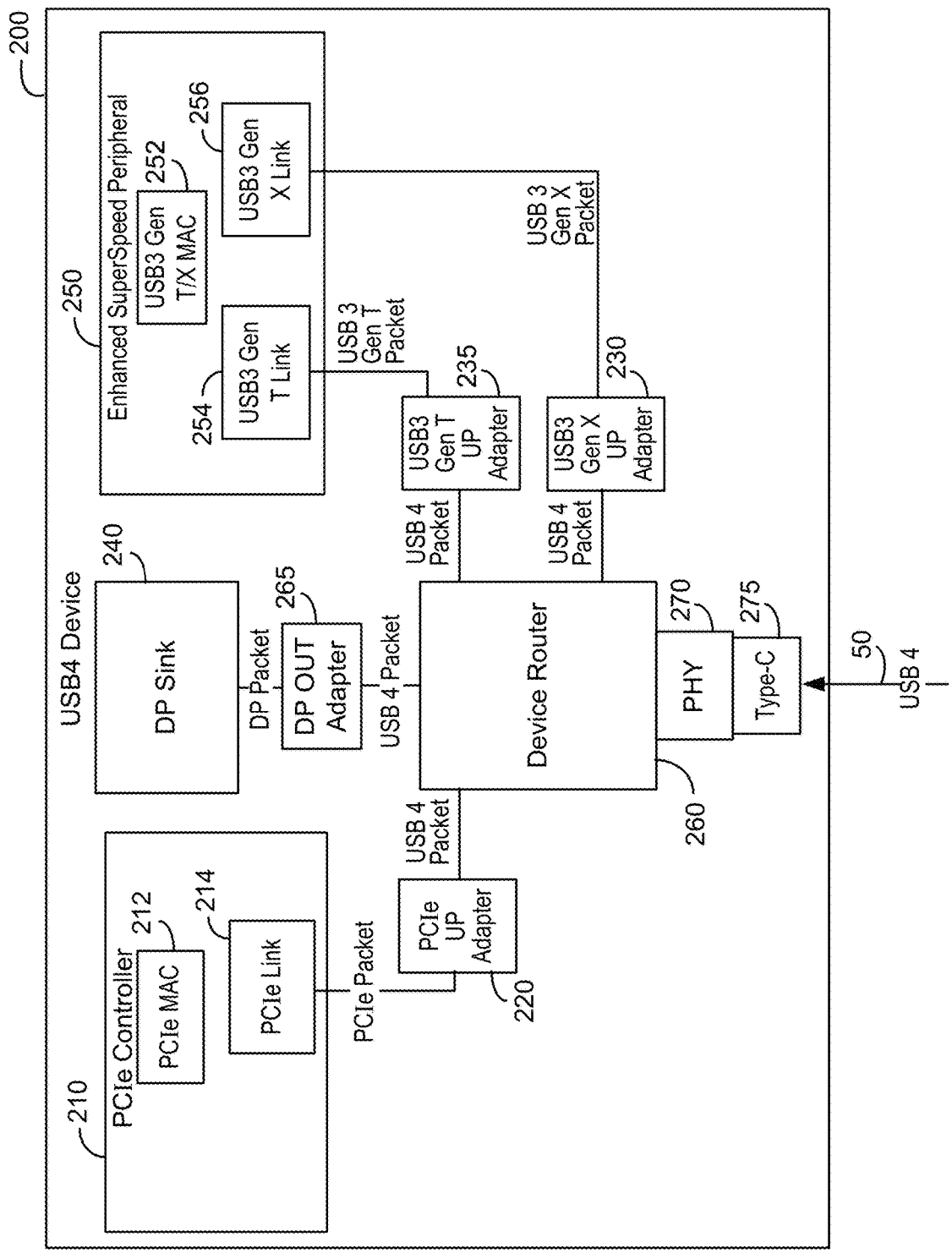

FIGS. 1A and 1B are a schematic block diagram of a Universal Serial Bus 4 (USB4) host controller (hereinafter alternatively referred to as host) 100 coupled to a USB4 device controller (hereinafter alternatively referred to as device) 200 via a USB-C type cable 50. USB4 host 100 is shown as including, in part, a Peripheral Component Interconnect Express (PCIe) controller 110, a pair of PCIe downstream adapters (alternatively referred to herein as PCIe adapters) 120, 125, a USB3 Generation (Gen) X downstream adapter 130 (alternatively referred to herein as USB3-X adapter 130), a USB3 Gen T downstream adapter 135 (alternatively referred to herein as USB3-T adapter 135), a display port (DP) source 140, an enhanced Super-Speed host controller 150, a host router 160, a DP input adapter 165, a physical layer controller (alternatively referred to herein as PHY) 170, and a USB-c type connector 175.

Enhanced SuperSpeed host controller 150, which is a USB3 protocol compliant controller, is shown as including, in part, a USB3 Gen T/X Media Access Controller (MAC) 152 that supports both USB3 Gen T and USB3 Gen X standards, a USB3 Gen T link controller (alternatively referred to herein as USB3 T-link) 154 and a USB3 Gen X link controller (alternatively referred to herein as USB3 X-link) 156.

USB3 T-link 154 provides a link between USB3 Gen T/X MAC 152 (alternatively referred to herein as USB3 MAC 152) and USB3-T adapter 135 by converting the packets received from USB3-T adapter 135 to a format required by USB3 MAC 152, and converting the packets received from USB3 MAC 152 to a format required by USB3-T adapter 135, as defined in the USB3 protocols. USB3-T adapter 135 is adapted to (i) convert the USB4 packets (i.e., packets complying with the USB4 protocol) received via host router 160 to USB3 Gen T packets (i.e., packets complying with the USB3, generation T protocol) and deliver the USB3 Gen T packets to USB3 T-link 154; and (i) convert the USB3 packets received from USB3 T-link 154 to USB4 packets, and deliver the USB4 packets to host router 160.

Similarly, USB3 X-link 156 provides a link between USB3 MAC 152 and USB3-X adapter 130 by converting the packets received from USB3-X adapter 130 to a format required by USB3 MAC 152, and converting the packets received from USB3 MAC 152 to a format required by USB3-X adapter 130, as is also defined in the USB3 X protocol. USB3-X adapter 130 is adapted to (i) convert the USB4 packets received via host router 160 to USB3 Gen X packets and deliver the USB3 Gen X packets to USB3 X-link 156; and (i) convert the USB3 packets received from USB3 X-link 156 to USB4 packets, and deliver the USB4 packets to host router 160.

PCIe link 116 provides a link between PCIe MAC 112 and PCIe adapter 120 by converting the PCIe-compliant packets received from PCI adapter 120 to a format required by PCIe MAC 112, and converting the packets received from PCIe MAC 112 to a format required by PCIe adapter 120. PCIe adapter 120 is adapted to (i) convert the USB4 packets received from host router 160 to PCIe packets (i.e., packets complying with the PCIe protocol) and deliver the PCIe packets to PCIe link 116; and (ii) convert the PCIe packets received from PCIe link 116 to USB4 packets and deliver the USB4 packets to host router 160. PCIe link 114 is similar to and operates in the same manner as PCIe link 116. PCIe adapter 125 is similar to and operates in the same manner as PCIe adapter 120. It is understood that USB4 host 100 may include any number of PCI-e adapters and PCIe links.

Host router 160 is configured to route the received packets based on the information stored in the packets' headers. PHY 170 is the physical layer controller that, among other operations, transmits the electrical signals associated with the data and control bits disposed in the packets. Connector 175 is a USB type-c connector.

USB4 device 200 is shown as including, in part, a PCIe controller 210, a PCIe upstream adapter (alternatively referred to herein as PCIe adapter) 220, a USB3 Gen X upstream adapter 230 (alternatively referred to herein as USB3-X adapter), a USB3 Gen T upstream adapter 235 (alternatively referred to herein as USB3-T adapter), a display port (DP) sink 240, an enhanced SuperSpeed peripheral controller 250, a device router 260, a DP output adapter 265, a PHY 270, and a USB4 type-c connector 275.

Enhanced SuperSpeed peripheral controller 250, which is a USB3 protocol compliant controller, is shown as including, in part, a USB3 Gen T/X MAC 252 that supports both USB3 Gen T and USB3 Gen X packets, a USB3 T-link 254 and a USB3 X-link 256.

USB3 T-link 254 provides a link between USB3 Gen T/X USB3 MAC 252 (alternatively referred to herein as USB3 MAC 252) and USB3-T adapter 235 by converting the packets received from USB3-T adapter 235 to a format required by USB3 MAC 252, and converting the packets received from USB3 MAC 252 to a format required by USB3-T adapter 235, as defined in the USB3 protocols. USB3-T adapter 235 is adapted to (i) convert the USB4 packets received from device router 260 to USB3 Gen T packets and deliver the USB3 Gen T packets to USB3 T-link 254; and (i) convert the USB3 packets received from USB3 T-link 254 to USB4 packets, and deliver the USB4 to device router 260.

Similarly, USB3 X-link 256 provides a link between USB3 MAC 252 and USB3-X adapter 230 by converting the packets received from USB3-X adapter 230 to a format required by USB3 MAC 252, and converting the packets received from USB3 MAC 252 to a format required by USB3-X adapter 230. USB3-X adapter 230 is adapted to (i) convert the USB4 packets received from device router 260 to USB3 Gen X packets and deliver the USB3 Gen X packets to USB3 X-link 256; and (i) convert the USB3 packets received from USB3 X-link 256 to USB4 packets, and deliver the USB4 to device router 260.

PCIe link 214 provides a link between PCIe MAC 212 and PCIe adapter 220 by converting the PCIe-compliant packets received from PCI adapter 220 to a format required by PCIe MAC 212, and converting the packets received from PCIe MAC 212 to a format required by PCIe adapter 220. PCIe adapter 220 is adapted to (i) convert the USB4 packets received from device router 260 to PCIe packets and deliver the PCIe packets to PCIe link 214; and (ii) convert the PCIe packets received from PCIe link 214 to USB4 packets and deliver the USB4 packets to device router 160.

Device router 260 is configured to route the received packets to their destinations based on the packets' headers. PHY 270 is the physical layer controller that, among other operations, transmits the electrical signals associated with the data and control bits disposed in the packets. Connector 175 is a USB type-c connector.

Figure 2:
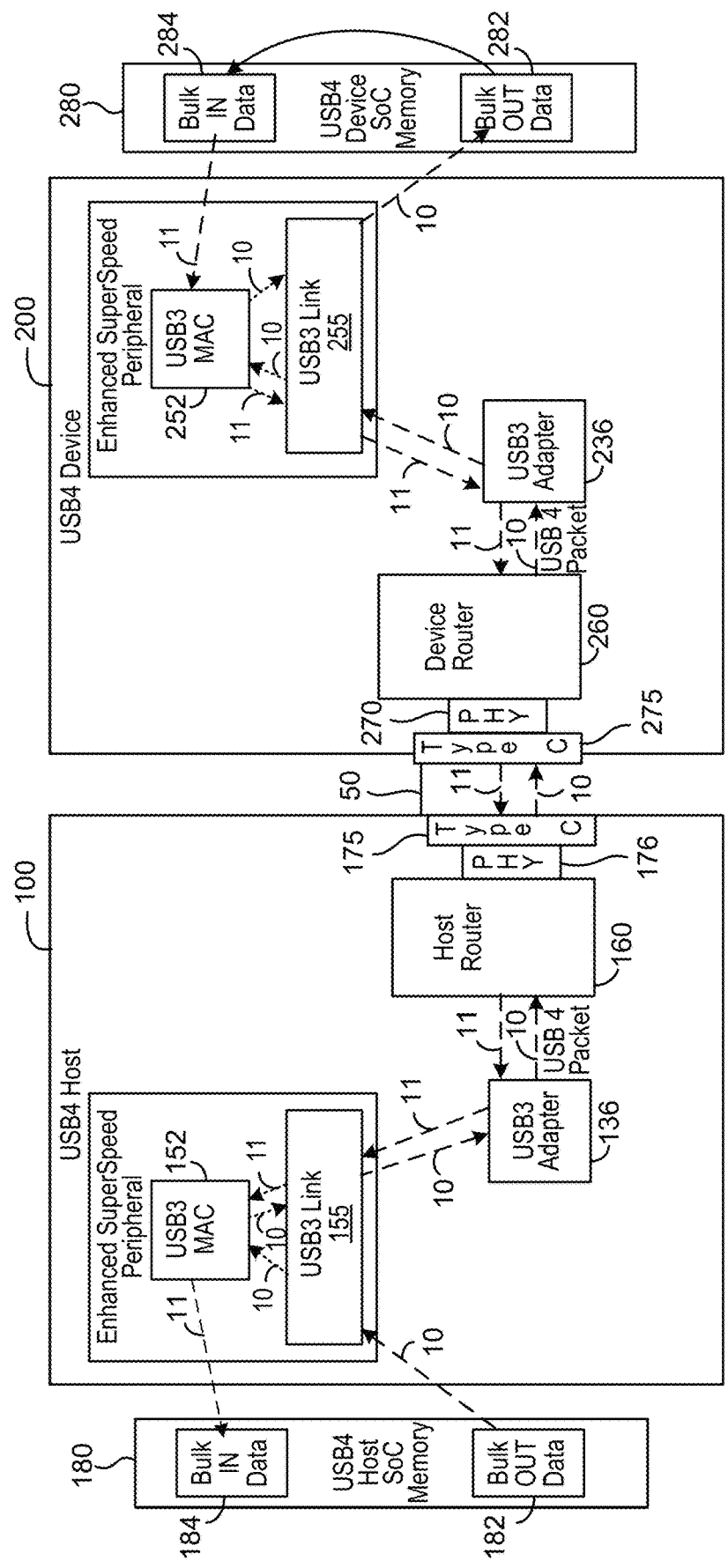
FIG. 2 shows the USB4 host controller of FIG. 1A connected to the USB4 device controller of FIG. 1B during a test.

FIG. 2 is a schematic diagram of a USB4 device 200 connected to a USB4 host 100 to perform a test. For simplicity and to avoid clutter, in the following description and figures, USB3-T link 154 and USB3-X link 156 of host 100 of FIG. 1A are collectively shown in FIG. 2 as USB3 link 155; USB3 Gen T adapter 135 and USB3 Gen X adapter 130 are collectively shown as USB3 adapter 136; and PCIe controller 110 is not shown. Similarly, USB3-T link 254 and USB3-X link 256 of device 200 of FIG. 1B are collectively shown in FIG. 2 as USB3 link 255; USB3 Gen T adapter 235 and USB3 Gen X adapter 230 are collectively shown as USB3 adapter 236, and PCIe controller 210 is not shown.

To perform the test, data stored in "Bulk Out Data" section 182 of memory 180 associated with USB4 host is retrieved, forwarded and caused to pass through components of host 100 in the following order: USB3 MAC 152, USB3 link 155, USB3 adapter 136, host router 160, PHY 170, type-c connector 175, and cable 50. The data transferred to cable 50 is then received, forwarded and caused to pass through components of device 200 in the following order: type-c connector 275, PHY 270, device router 260, USB3 adapter 236, USB3 link 255, and USB3 MAC 252. The data received by USB3 MAC 252 is subsequently stored in in "Bulk Out Data" section 282 of memory 280 associated with device 200. The path of the data transfer from "Bulk Out Data" section 182 of memory 180 to "Bulk Out Data" section 282 of memory 280 is shown using segmented arrow 10.

The data stored in "Bulk Out Data" section 282 of device memory 280 is then transferred to "Bulk In Data" section 284 of device memory 200. Thereafter, the data stored in "Bulk In Data" section 284 of memory 280 is forwarded and caused to pass through components of device 200 in the following order: USB3 MAC 252, USB3 link 255, device adapter 236, device router 260, PHY 270, type-c connector 275, and cable 50. The data transferred to cable 50 is then forwarded and caused to pass through components of host 100 in the following order: type-c connector 175, PHY 170, host router 160, USB3 adapter 136, USB3 link 155, and USB3 MAC 152. The data received by USB MAC 152 is subsequently stored in in "Bulk In Data" section 184 of memory 180. The path of the data transfer from "Bulk In Data" section 284 of memory 280 to "Bulk In Data" section 184 of memory 180 is shown using segmented arrow 11.

The data stored in the "Bulk In Data" section 184 is then compared to the data stored in "Bulk Out Data" section 182 that was forwarded along segmented arrow 10, as described above. If the comparison shows that the data stored in the "Bulk In Data" section 184 of memory 180 is the same as the data stored in "Bulk Out Data" section 182 of memory 180, the data integrity is verified and the test is considered a success.

Testing of a connectivity controller, such as a USB4 host controller, in accordance with embodiments of the present disclosure, is performed entirely within the USB4 host controller and without the need to connect the USB4 host controller to a USB4 device controller. To achieve this, a configuration register disposed in the USB4 host controller is set to a value that causes the data retrieved from the "Bulk Out Data" section of the memory associated with the USB4 host controller to be forwarded and pass through two or more components of the USB4 host controller and loop-back and return to "Bulk In Data" section of the memory associated with the USB4 host controller, where it is stored. A comparison between the data retrieved from the "Bulk Out Data" and the return data stored in the "Bulk In Data" of the memory associated with the host controller is then performed to check for data integrity and to verify the functionality of the USB4 host controller.

Figure 3:
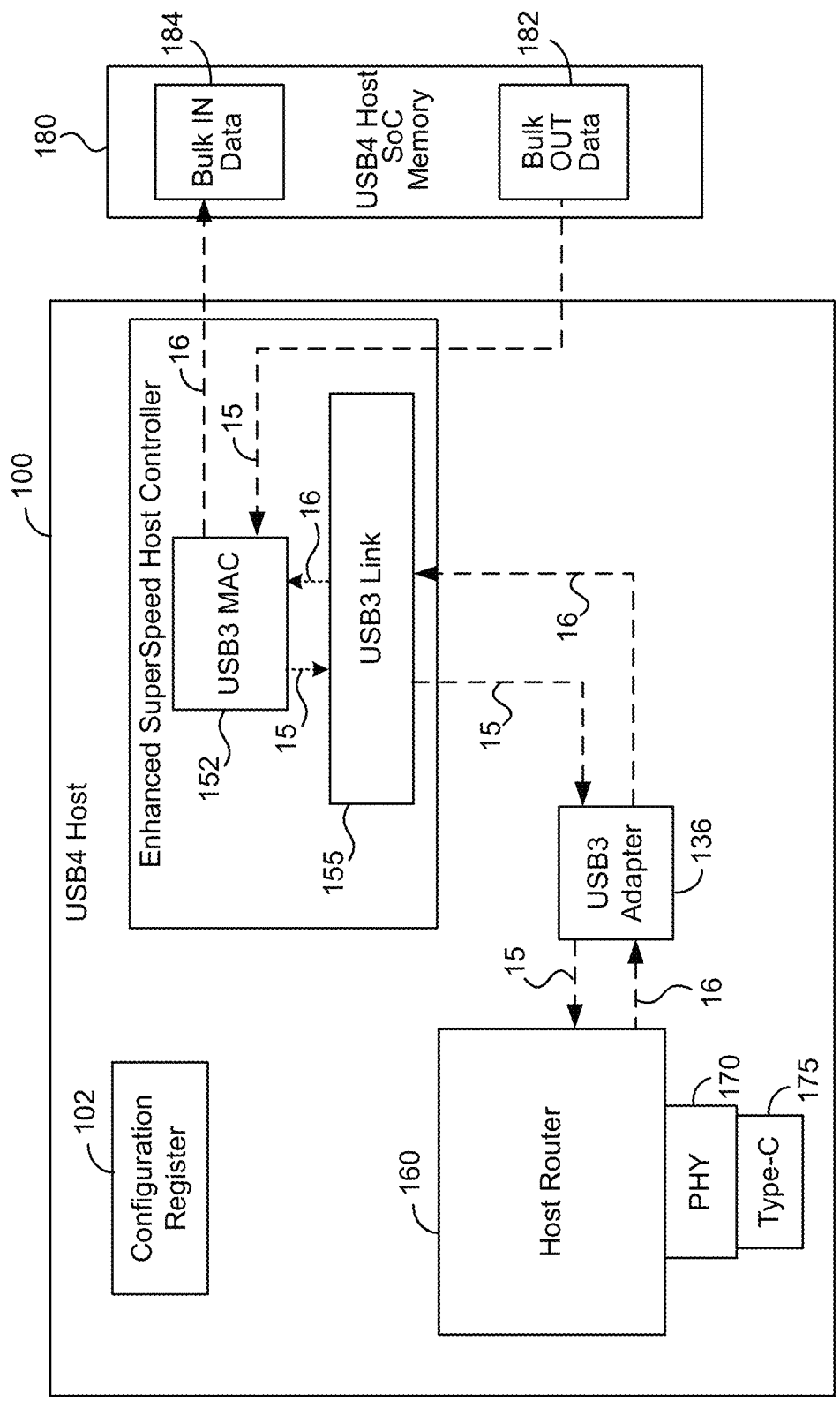
FIG. 3 shows a USB4 host controller during a test, in accordance with one embodiment of the present disclosure.

FIG. 3 shows, in part, the components of a USB4 host controller 100 (hereinafter host) and its associated memory 180, as was described above with reference to FIGS. 1 and 2. Also shown in FIG. 3 is a configuration register 102, disposed in host 100, that may be set to any number of different values defining two or more components of host 100 in which the data packets stored in "Bulk Out Data" 182 of memory 180 is forwarded and caused to pass through, before looping back and returning for storage in the "Bulk In Data" 184 of memory 180. An application software residing on a device (e.g., a personal computer, a mobile communication device, and the like) in which USB4 host controller 100 is disposed, may access and set the configuration register to any number of different values. USB3 MAC 152, in accordance with one aspect of the present disclosure, sets the direction bit of the packets received from "Bulk Out Data" 182 to a first logic level, (e.g. 0) to indicate that the packets are to be forwarded to the USB4 host, and sets the direction bit of the packets that loop back and return to a second logic level (e.g., 1) to indicate that the return packets are to be stored in "Bulk In Data" 184.

In FIG. 3, configuration register 102 is set to a value that causes the data retrieved from "Bulk Out Data" section 182 to be forwarded and pass through components of host 100 in the following order: USB3 MAC 152, USB3 link 155, USB3 adapter 136 and host router 160. The path of the data from "Bulk Out Data" 182 to host router 160 is identified using segmented arrow 15. As part of the handshake, an acknowledgment (ACK) is made upon receipt of a message requesting forwarding of the data.

The value set by the configuration register 102 then causes the data reaching host router 160 to loop back from host router 160, return and pass through components of host 100 in the following order: USB3 adapter 136, USB3 link 155, and USB3 MAC 152. The data is then stored in "Bulk In Data" section 184 of memory 180. The path of the return data from host router 160 to "Bulk In Data" 184 is identified using segmented arrow 16. The data retrieved from the "Bulk Out Data" 182 is then compared to the return data stored in "Bulk In Data" 182. If the comparison shows that the data retrieved and forwarded from the "Bulk Out Data" 182 matches the return data stored in "Bulk In Data" 184, the functionality of components USB3 MAC 152, USB3 link 155, USB3 adapter 136 and host router 160 is verified by the test.

Figure 4:
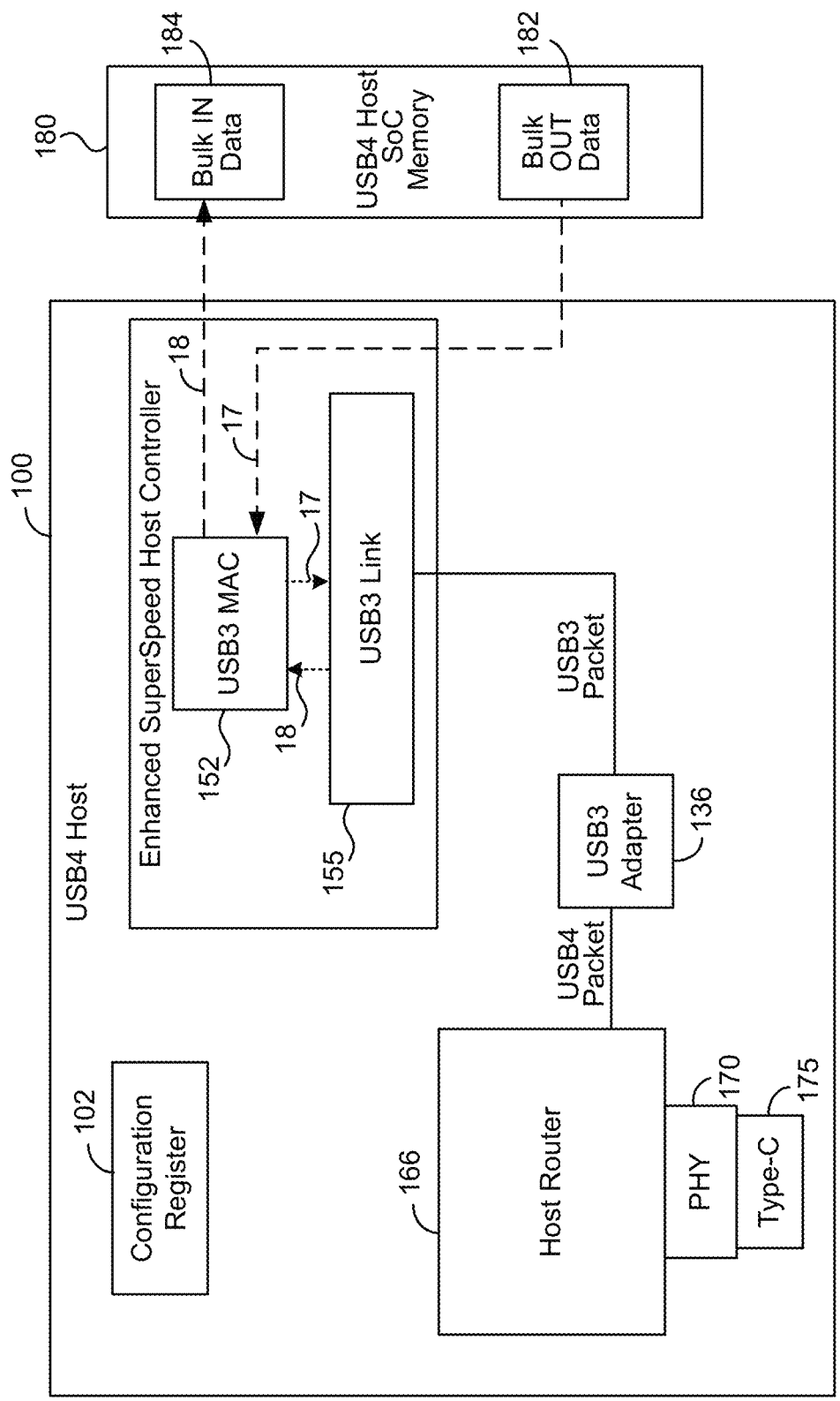
FIG. 4 shows a USB4 host controller during another test, in accordance with one embodiment of the present disclosure.

FIG. 4 shows a USB4 host controller during another test, in accordance with one embodiment of the present disclosure. In FIG. 4, the configuration register is set to a value that causes the data loop back to occur within USB3 link 155 of host 100. Accordingly, the data retrieved from "Bulk Out Data" 182 is forwarded and caused to pass through components of host 100 in the following order: USB3 MAC 152, and USB3 link 155, as identified by arrow 17. The data in USB3 link 155 then loops back and returns to USB3 MAC 152 which then stores the data in "Bulk In Data" 184 of memory 180. The path of the data from USB3 link 155 to "Bulk In Data" 184 is identified using arrow 18. By comparing the data retrieved and forwarded from the "Bulk Out Data" 182 to the return data stored in "Bulk In Data" 184, the functionality of USB3 MAC 152, and USB3 link 155 may be tested.

Figure 5:
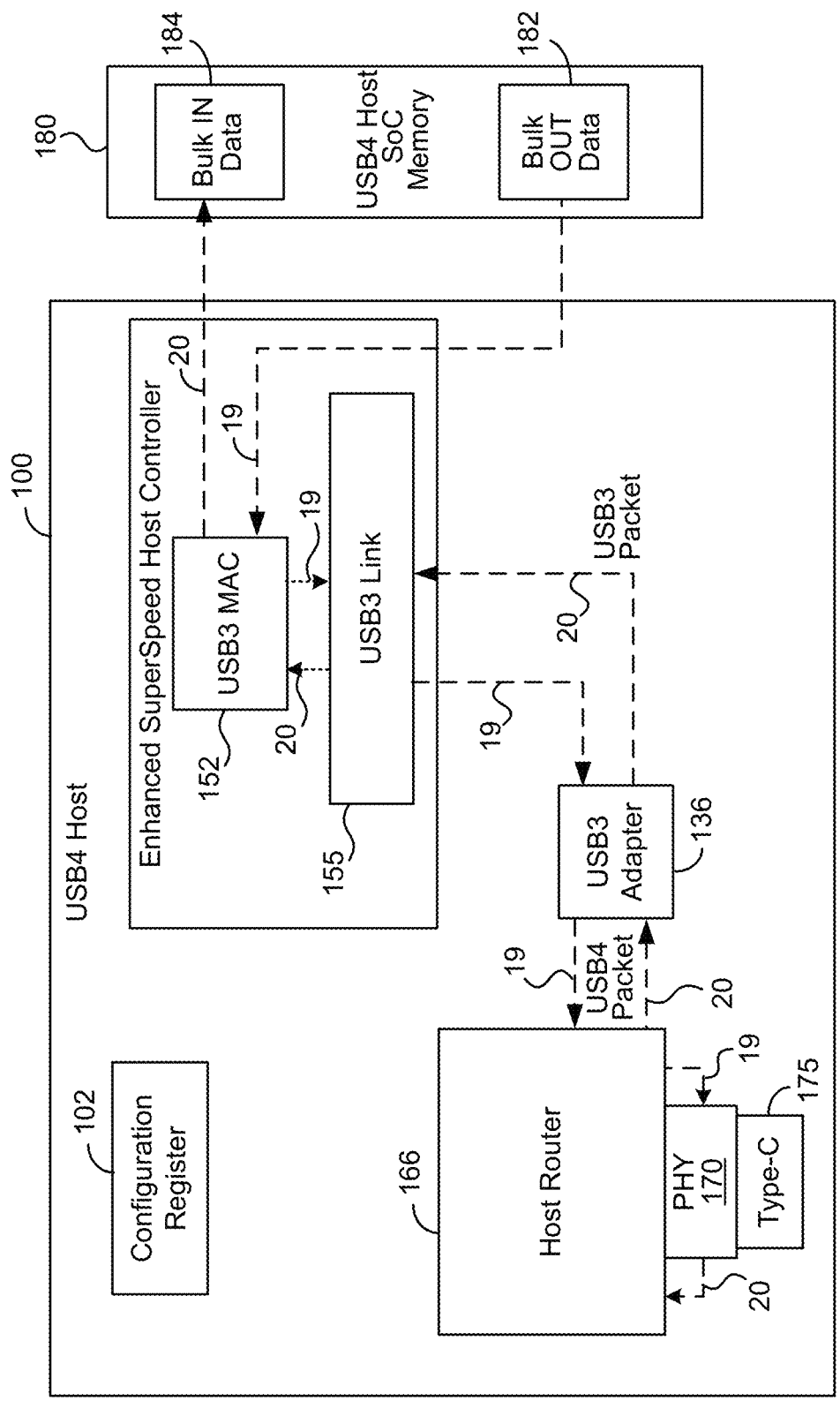
FIG. 5 shows a USB4 host controller during another test, in accordance with one embodiment of the present disclosure.

FIG. 5 shows a USB4 host controller during another test, in accordance with one embodiment of the present disclosure. In FIG. 5, the configuration register is set to a value that causes the data loop back to occur within PHY 170 of host 100. Accordingly, the data retrieved from "Bulk Out Data" section 182 is forwarded and caused to pass through components of host 100 in the following order: USB3 MAC 152, USB3 link 155, USB3 adapter 136, host router 166, and PHY 170, as identified by segmented arrow 19. The data in PHY 170 then loops back, returns and passes through components of host 100 in the following order: host router 166, USB3 adapter 136, USB3 link 152, and USB3 Mac 152. The return data is then stored by USB3 Mac 152 in "Bulk In Data" 184 of memory 180. The path of the return data is identified by arrow 20. By comparing the data retrieved and forwarded from the "Bulk Out Data" 182 to the return data stored in "Bulk In Data" 184, the functionality of USB3 MAC 152, USB3 link 155, USB3 adapter 136, host router 166 and PHY 170 may be tested.

Figure 6:
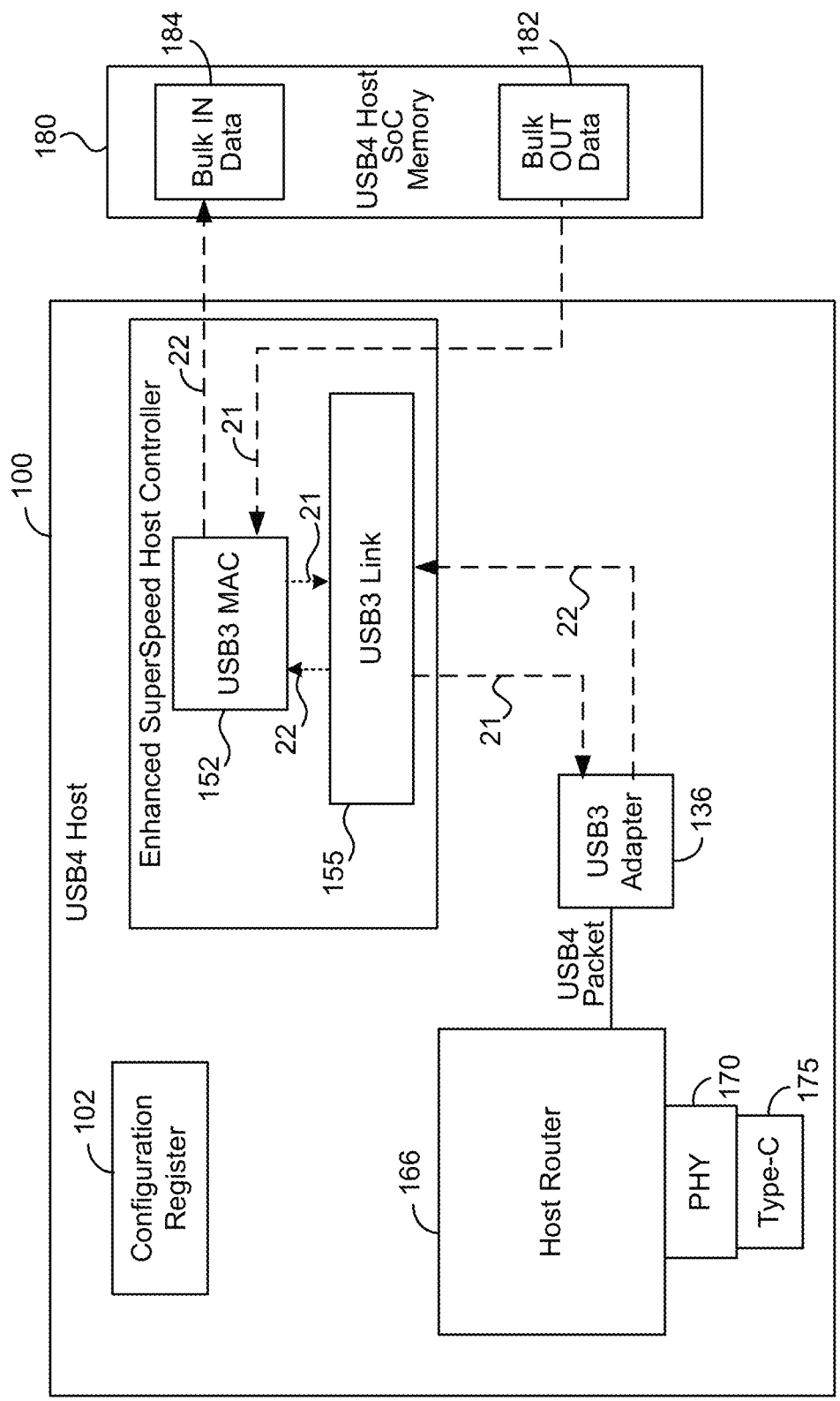
FIG. 6 shows a USB4 host controller during another test, in accordance with one embodiment of the present disclosure.

FIG. 6 shows a USB4 host controller during another test, in accordance with one embodiment of the present disclosure. In FIG. 6, the configuration register is set to a value that causes the data loop back to occur within USB3 adapter 136 of host 100. Accordingly, the data retrieved from "Bulk Out Data" 182 is forwarded and caused to pass through components of host 100 in the following order: USB3 MAC 152, USB3 link 155, and USB3 adapter 136, as identified by segmented arrow 21. The data in USB3 adapter 136 then loops back, returns and passes through components of host 100 in the following order: USB3 link 155, and USB3 Mac 152. The return data is then stored by USB3 MAC 152 in "Bulk In Data" 184 section of memory 180. The path of the return data is identified by segmented arrow 22. By comparing the data retrieved and forwarded from the "Bulk Out Data" 182, to the return data stored in "Bulk In Data" 184, the functionality of USB3 MAC 152, USB3 link 155, and USB3 adapter 136 may be tested.

Figure 7:
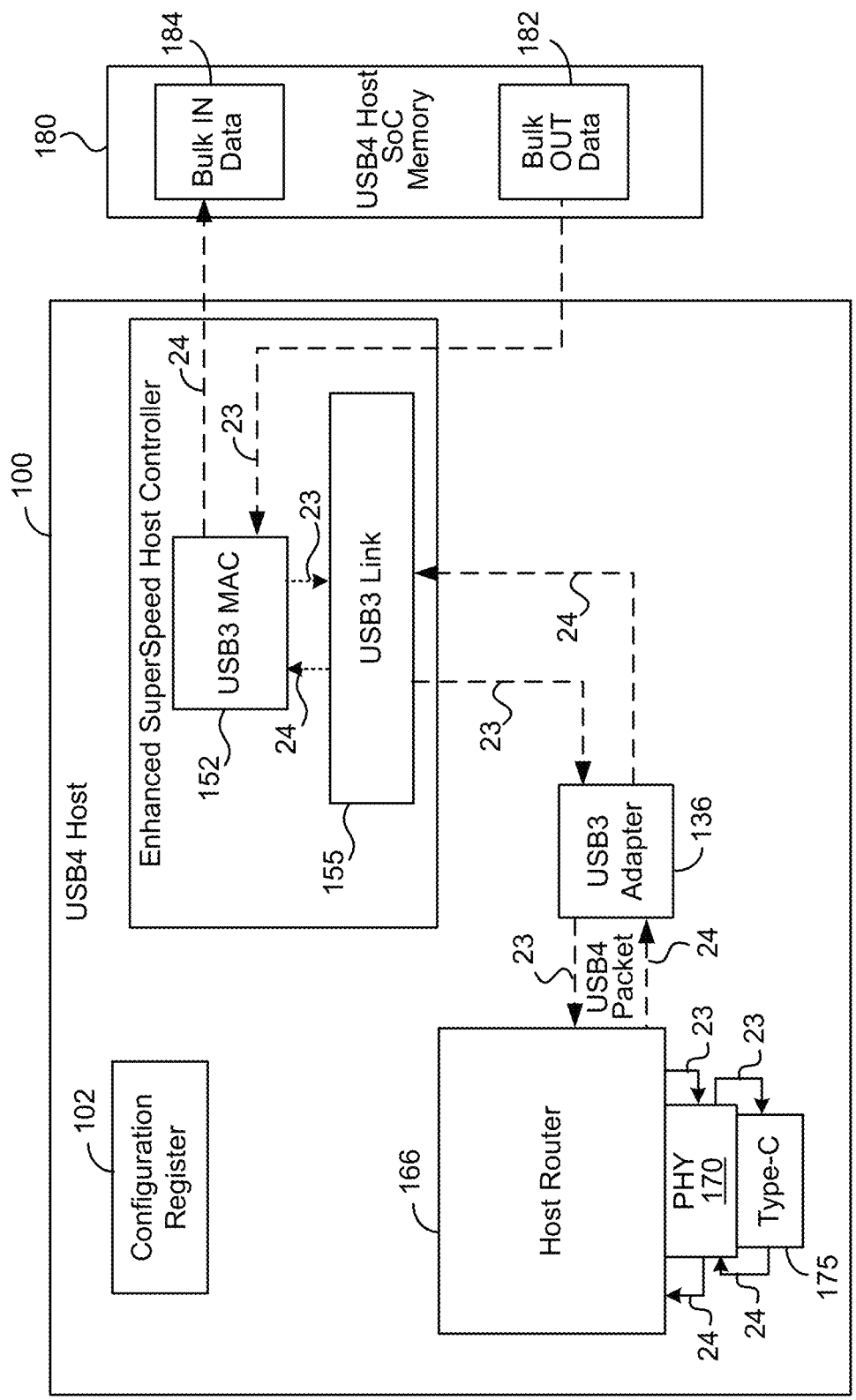
FIG. 7 shows a USB4 host controller during another test, in accordance with one embodiment of the present disclosure.

FIG. 7 shows a USB4 host controller during another test, in accordance with one embodiment of the present disclosure. In FIG. 7, the configuration register is set to a value that causes the data loop back to occur within type-c connector 175 of host 100. Accordingly, the data retrieved from "Bulk Out Data" 182 is forwarded and caused to pass through components of host 100 in the following order: USB3 MAC 152, USB3 link 155, USB3 adapter 136, host router 166, PHY 170, and type-c connector 175; the path of the data is identified by arrow 23. The data in type-c connector 175 then loops back, returns and is caused to pass through components of host 100 in the following order: PHY 170, host router 166, USB3 adapter 136, USB3 link 155, and USB3 Mac 152. The data is then stored in "Bulk In Data" section 184 of memory 180. The path of the return data is identified by arrow 24. By comparing the data retrieved and forwarded from "Bulk Out Data" section 182 to the return data stored in "Bulk In Data" section 184, the functionality of USB3 MAC 152, USB3 link 155, USB3 adapter 136, host router 166, PHY 170 and type-c connector 175 may be tested.

Similarly, testing of a connectivity controller, such as a USB4 device controller (USB4 device), in accordance with embodiments of the present disclosure, is performed entirely within the USB4 device and without the need to connect the USB4 device to a USB4 host. To achieve this, a configuration register disposed in the USB4 device is set to a value that causes the data retrieved from the "Bulk In Data" memory section of the memory associated with the USB4 device to be forwarded and pass through two or components of the USB4 device. The data then loops back and returns to "Bulk Out Data" memory section of the memory associated with the USB4 device controller, where it is stored. A comparison between the data retrieved from the "Bulk In Data" and the data stored in the "Bulk Out Data" of the memory associated with the USB4 device controller is then performed to check for data integrity and to verify the functionality of the components of the USB4 device.

Figure 8:
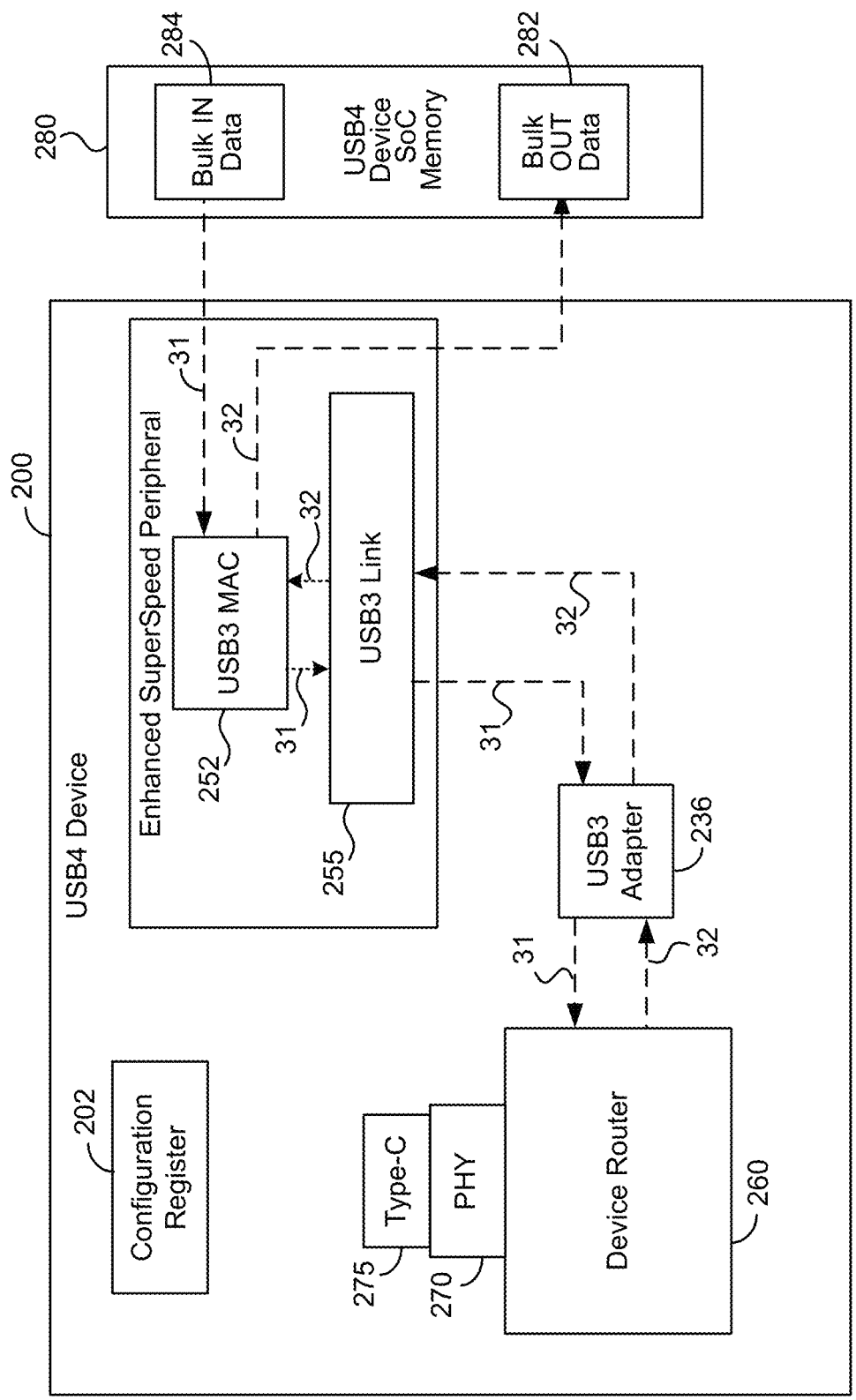
FIG. 8 shows a USB4 device controller during a test, in accordance with one embodiment of the present disclosure.

FIG. 8 shows, in part, the components of a USB4 device 200 and its associated memory 280, as was described above with reference to FIG. 2. Also shown in FIG. 3 is a configuration register 202, disposed in USB4 device 200, that may be set to any number of different values defining two or more components of device 200 in which the data packets stored in "Bulk In Data" 284 of memory 280 is forwarded and caused to pass through, before looping back and returning for storage in the "Bulk Out Data" 282 of memory 200.

In FIG. 8, configuration register 202 is set to a value that causes the data retrieved from "Bulk In Data" 284 to be forwarded and pass through components of device 200 in the following order: USB3 MAC 252, USB3 link 255, USB3 adapter 236, and device router 260. The path of the data from "Bulk In Data" 282 to device router 260 is identified using segmented arrow 31. The data set by the configuration register 202 then causes the data reaching device router 260 to loop back, return and pass through components of device 200 in the following order: USB3 adapter 236, USB3 link 255, and USB3 MAC 252. The return data is then stored in "Bulk Out Data" section 282 of memory 280 by USB3 MAC 252. The path of the return data from router 260 to "Bulk Out Data" 284 is identified using segmented arrow 32. By comparing the data retrieved and forwarded from "Bulk In Data" memory section 284 to the return data stored in "Bulk Out Data" memory section 282, the functionality of components USB3 MAC 252, USB3 link 255, USB3 adapter 236 and device router 260 may therefore be tested.

Figure 9:
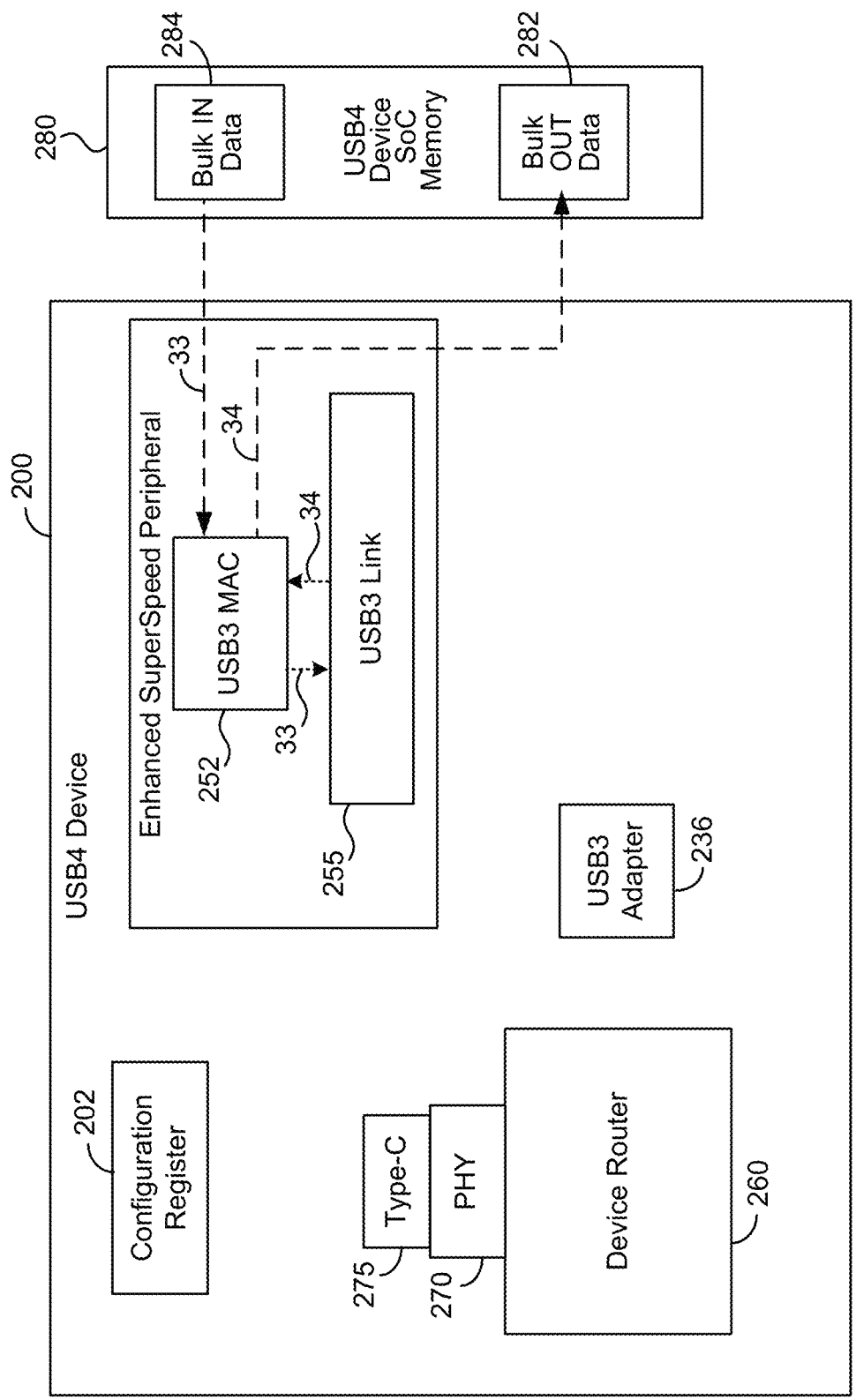
FIG. 9 shows a USB4 device controller during another test, in accordance with one embodiment of the present disclosure.

FIG. 9 shows a USB4 device controller during another test, in accordance with one embodiment of the present disclosure. In FIG. 9, the configuration register 202 is set to a value that causes the data loop to occur within USB3 link 255 of device 200. Accordingly, the data retrieved from "Bulk In Data" section 284 is forwarded and caused to pass through components of device 200 in the following order: USB3 MAC 252, and USB3 link 255; the path of this data is identified by segmented arrow 33. The data in USB3 link 255 then loops back and returns to USB3 MAC 252 before being stored in "Bulk Out Data" memory section 282. The path of the return data from USB3 link 255 to "Bulk Out Data" memory section 282 is identified using segmented arrow 34. By comparing the data retrieved and forwarded from the "Bulk In Data" section 284 to the return data stored in "Bulk Out Data" section 282, the functionality of USB3 MAC 252, and USB3 link 255 may therefore be tested.

Figure 10:
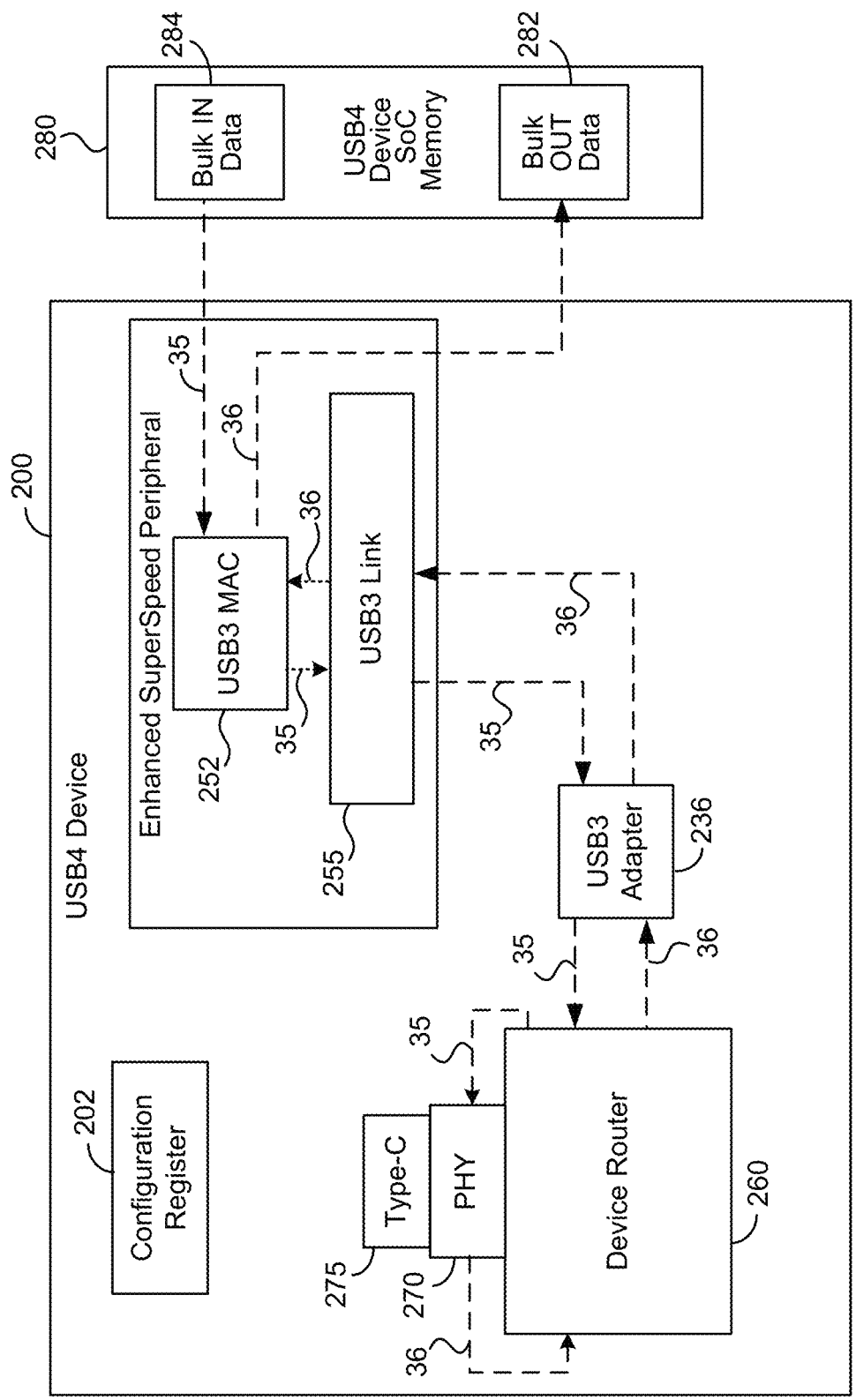
FIG. 10 shows a USB4 device controller during another test, in accordance with one embodiment of the present disclosure.

FIG. 10 shows a USB4 device controller during another test, in accordance with one embodiment of the present disclosure. In FIG. 10, the configuration register is set to a value that causes the data loop back to occur within PHY 270 of device 200. Accordingly, the data retrieved from "Bulk In Data" section 284 is forwarded and caused to pass through components of device 200 in the following order: USB3 MAC 252, USB3 link 255, USB3 adapter 236, device router 260, and PHY 270; the path of this data is identified by segmented arrow 35. The data in PHY 270 then loops back, returns and passes through components of device 200 in the following order: device router 260, USB3 adapter 236, USB3 link 255, and USB3 Mac 252. The return data is then stored in "Bulk Out Data" section 282 of memory 280 by USB3 Mac 252. The path of the return data is identified using segmented arrow 36. By comparing the data retrieved and forwarded from "Bulk In Data" memory section 284 to the return data stored in "Bulk Out Data" memory section 282, the functionality of USB3 MAC 252, USB3 link 255, USB3 adapter 236, router 260 and PHY 270 may be tested.

Figure 11:
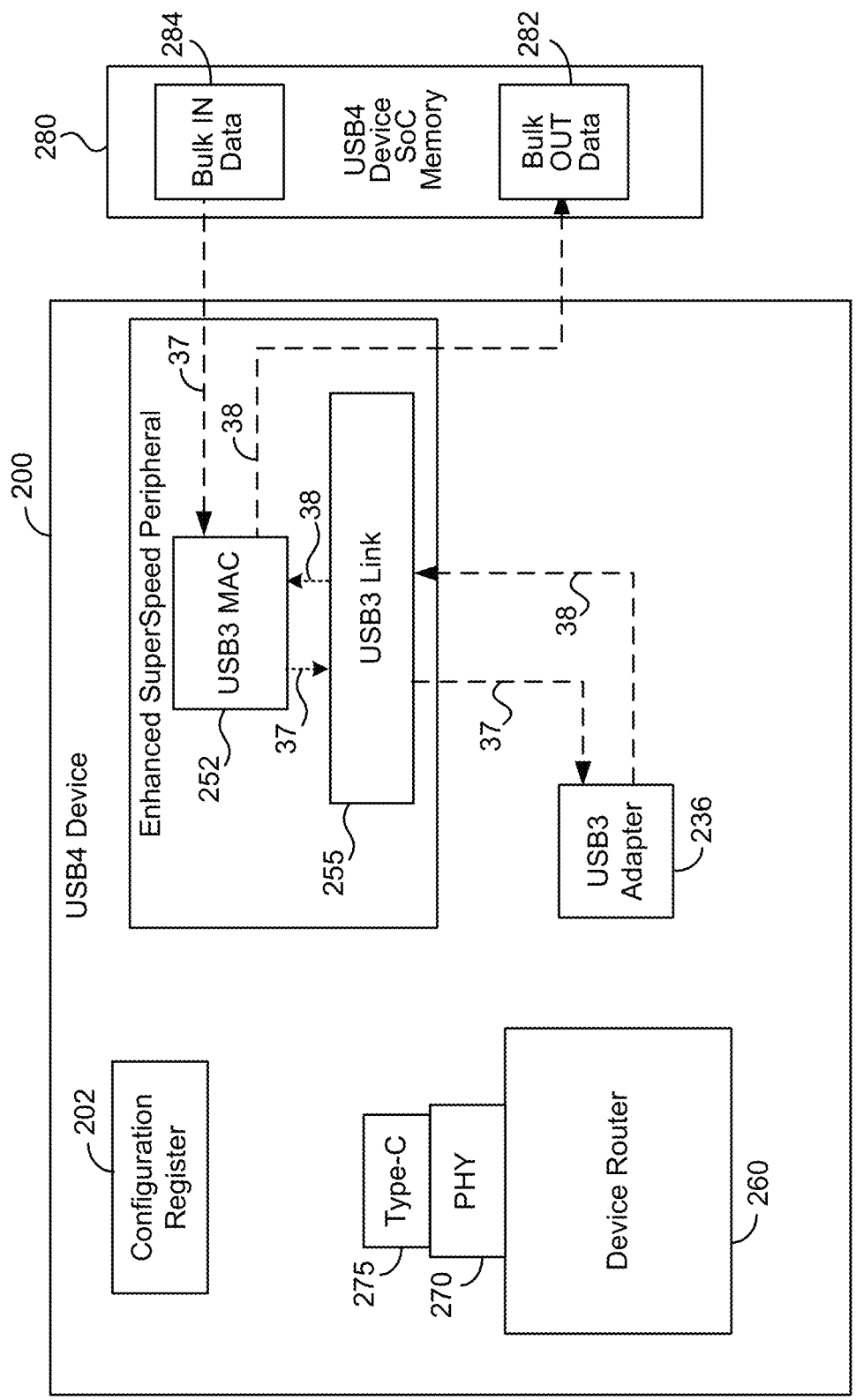
FIG. 11 shows a USB4 device controller during another test, in accordance with one embodiment of the present disclosure.

FIG. 11 shows a USB4 device controller during another test, in accordance with one embodiment of the present disclosure. In FIG. 11, the configuration register is set to a value that causes the data loop back to occur within USB3 adapter 236 of device 200. Accordingly, the data retrieved from "Bulk In Data" memory section 284 is forwarded and caused to pass through components of device 200 in the following order: USB3 MAC 152, USB3 link 255, and USB3 adapter 236; the path of this data is identified using segmented arrow 37. The data in USB3 adapter 236 then loops back, returns and passes through components of device 200 in the following order: USB3 link 255, and USB3 Mac 252. The return data is then stored in "Bulk Out Data" section 282 of memory 280. The path of the return data is identified using segmented arrow 38. By comparing the data retrieved and forwarded from the "Bulk In Data" section 284 to the return data stored in "Bulk Out Data" 282, the functionality of USB3 MAC 252, USB3 link 255, and USB3 adapter 236 may be tested.

Figure 12:
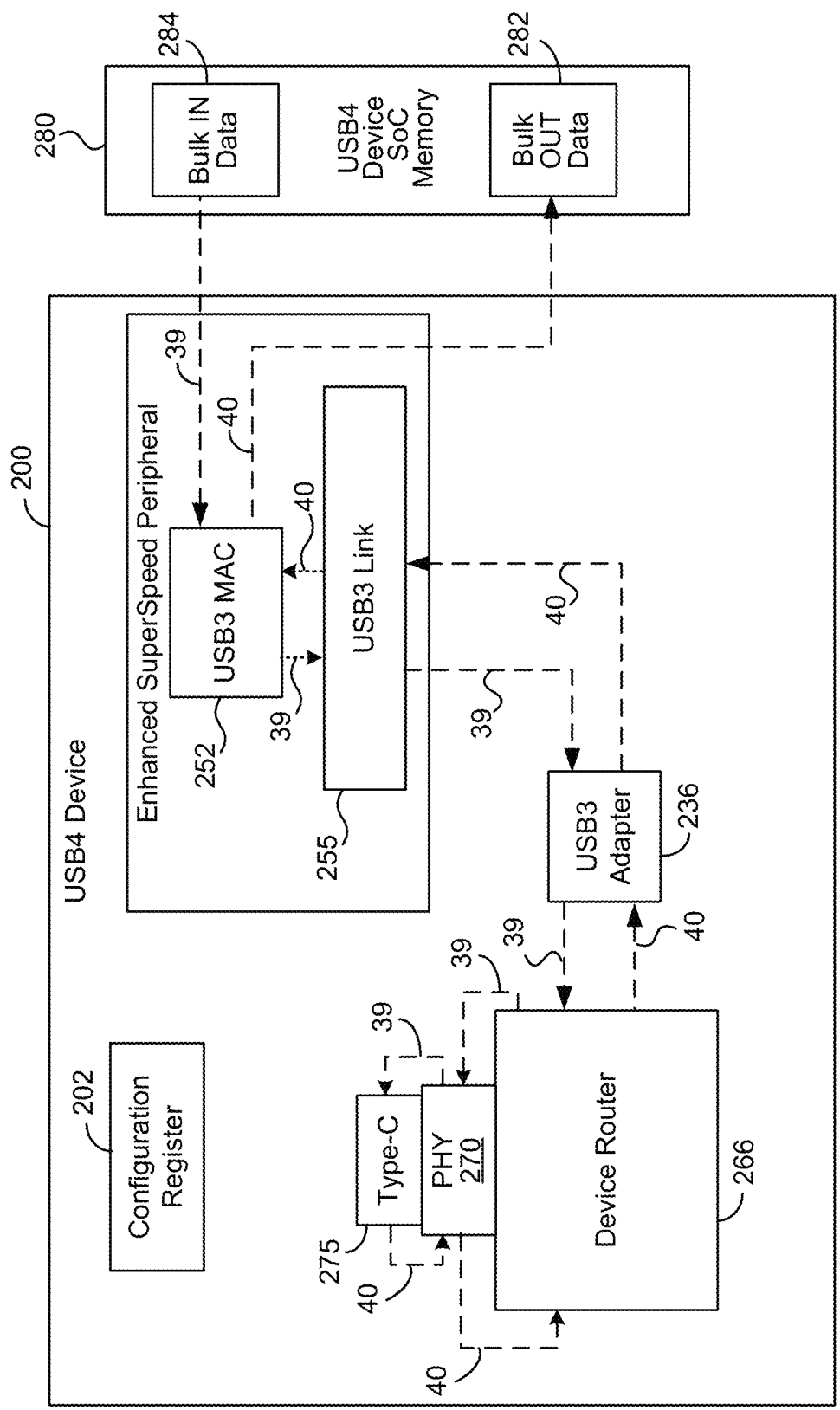
FIG. 12 shows a USB4 device controller during another test, in accordance with one embodiment of the present disclosure.

FIG. 12 shows a USB4 device controller during another test, in accordance with one embodiment of the present disclosure. In FIG. 12, the configuration register 202 is set to a value that causes the data loop back to occur within type-c connector 275 of device 200. Accordingly, the data retrieved from "Bulk In Data" section 284 is forwarded and caused to pass through components of device 200 in the following order: USB3 MAC 252, USB3 link 255, USB3 adapter 236, device router 260, PHY 170, and type-c connector 275; the path of this data is identified by segmented arrow 39. The data in type-c connector 275 then loops back, returns and caused to pass through components of device 200 in the following order: PHY 270, device router 260, USB3 adapter 236, USB3 link 255, and USB3 Mac 252. The return data is then stored in "Bulk Out Data" section 282 of memory 280 by USB3 Mac 252. The path of the return data is identified using segmented arrow 40. By comparing the data retrieved and forwarded from the "Bulk In Data" section 284 to the return data stored in "Bulk Out Data"

section 282, the functionality of USB3 MAC 252, USB3 link 255, USB3 adapter 236, device router 260, PHY 270 and type-c connector 275 may be tested.

In accordance with one aspect of the present disclosure, each component of a USB4 host or a USB4 device controller, including the PHY, router, adapters, USB3-T link, USB3-X link, and USB3 MAC 252, as described in detail with reference to any of the Figures above, is configured to inspect and validate the packet the component receives. Such validation includes ensuring that the various fields of the received packets, including the cyclic redundancy check (CRC) field of the packet, have correct values, and that the received packets conform to the applicable USB protocol(s) in their entirety.

Figure 13:
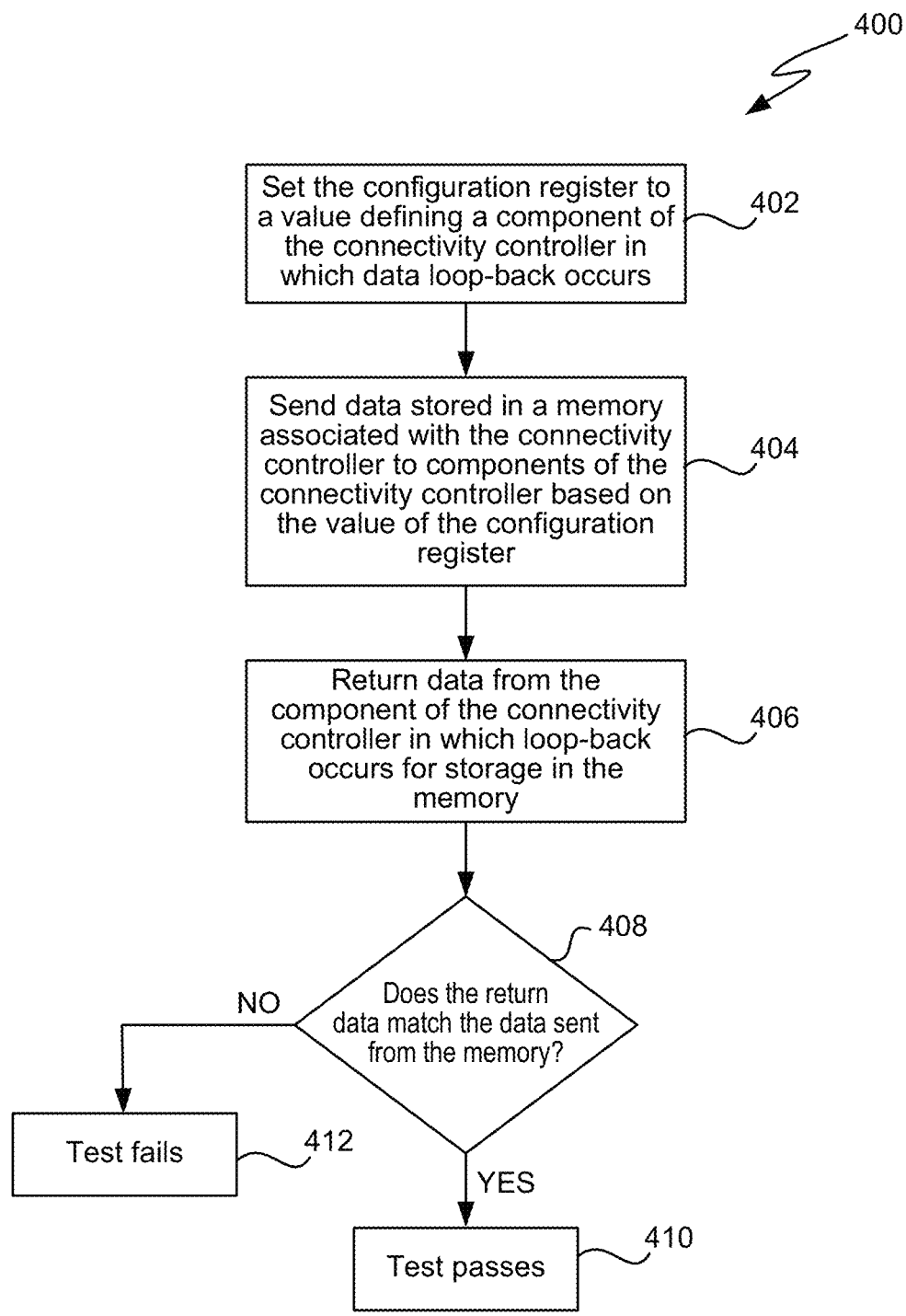
FIG. 13 is a flowchart for testing a USB4 controller, in accordance with one embodiment of the present disclosure.

FIG. 13 is a flowchart 400 for testing a connectivity controller, in accordance with one embodiment of the present disclosure. At 402, the configuration register disposed in the connectivity controller is set to a value defining the components of the connectivity controller to which the data packets stored in a memory associated with the connectivity controller are forwarded and caused to pass through, before the data packets loop back and return for storage in the memory. At 404, the data packets stored in the memory are forwarded and caused to pass through the connectivity controller components in accordance with the value of the configuration register. At 406, the data packets loop back and return from the component of the connectivity controller defined by the configuration register value. The returned data packets are stored in the memory. At 408, a comparison is made to determine whether the data packets forwarded from the memory to the components of the connectivity controller match the returned data packets. If at 408, the data packets forwarded from the memory and the returned data packets are determined to match, then the test passes and is considered a success at 410. If at 408, the data packets forwarded from the memory and the returned data packets are determined not to match, then the test is considered a failure at 412. The MAC controller disposed in the connectivity controller sets the direction bit of the data packets that are forwarded from the memory to a first logic level (e.g., 0). The MAC controller sets the direction bit of the data packets that return and are to be stored in the memory to a second logic level (e.g., 1).

Figure 14:
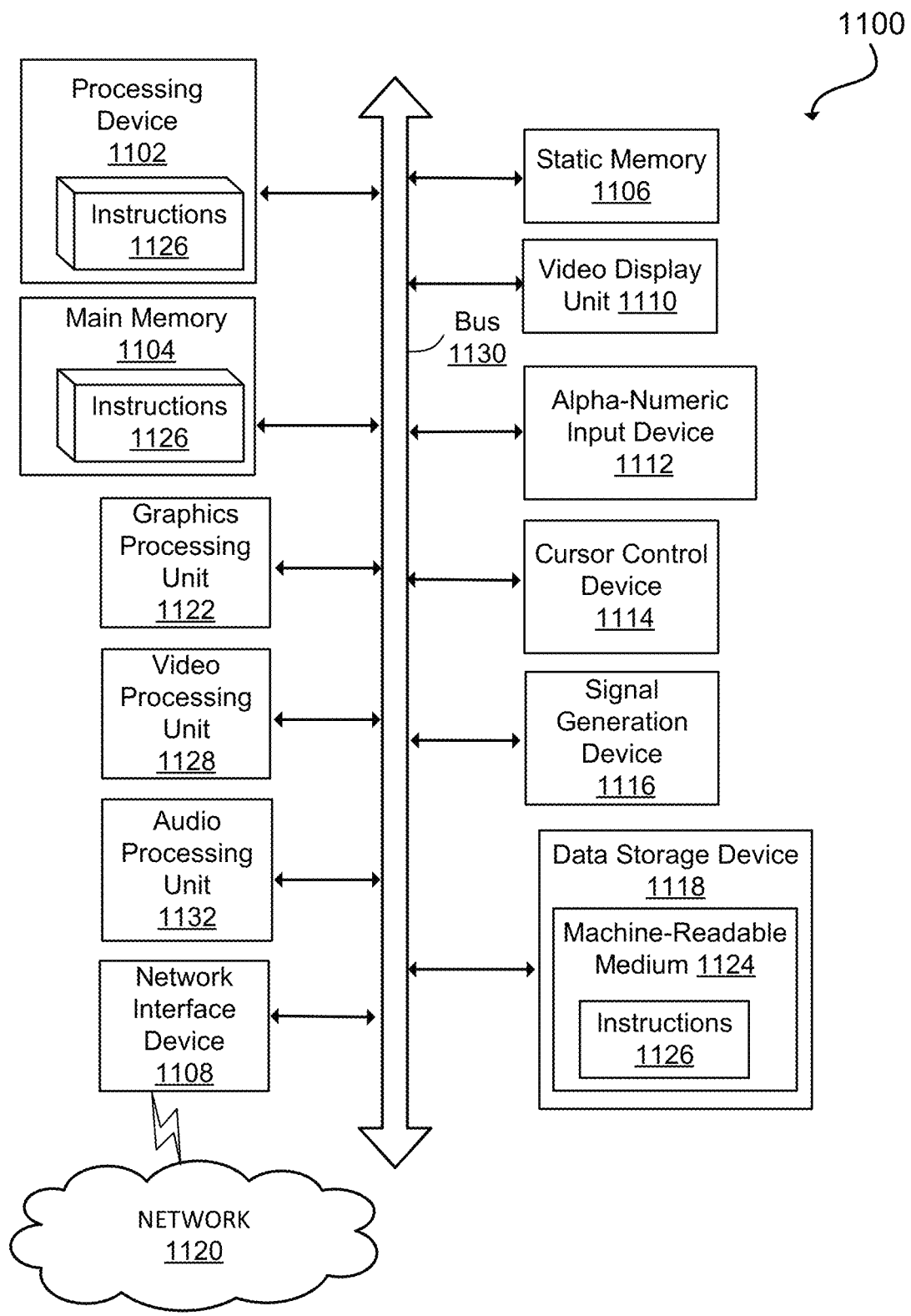
FIG. 14 depicts an example of a computer system in which embodiments of the present disclosure may operate.

FIG. 14 illustrates an example machine of a computer system 1100 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1100 includes a processing device 1102, a main memory 1104 (e.g., read-only memory (ROM), flash memory, dynamic random access memory (DRAM) such as synchronous DRAM (SDRAM), a static memory 1106 (e.g., flash memory, static random access memory (SRAM), etc.), and a data storage device 1118, which communicate with each other via a bus 1130.

Processing device 1102 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. The processing device 1102 may be configured to execute instructions 1126 for performing the operations and steps described herein.

The computer system 1100 may further include a network interface device 1108 to communicate over the network 1120. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), a graphics processing unit 1122, a signal generation device 1116 (e.g., a speaker), graphics processing unit 1122, video processing unit 1128, and audio processing unit 1132.

The data storage device 1118 may include a machine-readable storage medium 1124 (also known as a non-transitory computer-readable medium) on which is stored one or more sets of instructions 1126 or software embodying any one or more of the methodologies or functions described herein. The instructions 1126 may also reside, completely or at least partially, within the main memory 1104 and/or within the processing device 1102 during execution thereof by the computer system 1100, the main memory 1104 and the processing device 1102 also constituting machine-readable storage media.

In some implementations, the instructions 1126 include instructions to implement functionality corresponding to the present disclosure. While the machine-readable storage medium 1124 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1102 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

What is claimed:

1. A method of testing a connectivity controller, the method comprising:
    setting a configuration register disposed in the connectivity controller to a first value;
    causing a first data stored in a first section of a memory associated with the connectivity controller to be forwarded and pass through at least a first component of the connectivity controller and a second component of the connectivity controller, in sequence, in response to the first value;
    returning data received by the second component, via the first component, for storage in a second section of the memory;
    comparing, by a processor, the first data to the data returned and stored in the second section of the memory; and
    verifying the test if the first data matches the returned data.

2. The method of claim 1, wherein the connectivity controller is one or more of a Universal Serial Bus 4 (USB4) host controller and a USB4 device controller.

3. The method of claim 2, wherein the USB4 controller is configured to process both USB3 generation T packets and USB3 generation X packets.

4. The method of claim 3, wherein the first component is a USB3 media access controller.

5. The method of claim 4, wherein the second component is a USB3 link controller.

6. The method of claim 2 further comprising:
    validating, by the first component, that a packet represented by the first data conform to the USB4 communications protocols; and
    validating, by the second component, that a packet represented by the data returned to the second section of the memory conform the USB4 communications protocol.

7. The method of claim 2 further comprising:
    setting the configuration register to a second value;
    causing a second data stored in the first section of the first memory to be forwarded to a physical access layer (PHY) of the USB4 controller;
    returning data from the PHY for storage in the second section of the memory;
    comparing the second data to the data returned from the PHY and stored in the second section of the memory; and
    verifying the test if the second data matches the data returned from the PHY.

8. The method of claim 2, the method further comprising:
    setting a direction bit of a packet represented by the first data to a first logic level; and
    setting a direction bit of a packet represented by the returned data to a second logic level.

9. A system comprising:
    a memory storing instructions; and
    a processor, coupled with the memory and configured to execute the instructions, the instructions when executed causing the processor to:
    set a configuration register disposed in a connectivity controller to a first value;
    cause a first data stored in a first section of a memory associated with the connectivity controller to be forwarded and pass through at least a first component of the connectivity controller and a second component of the connectivity controller, in sequence, in response to the first value;
    return data received by the second component, via the first component, for storage in a second section of the memory;
    compare the first data to the data returned and stored in the second section of the memory; and
    verify the test if the first data matches the return data.

10. The system of claim 9, wherein the connectivity controller is one or more of a USB4 host controller and a USB4 device controller.

11. The system of claim 10, wherein the USB4 controller is configured to process both USB3 generation T packets and USB3 generation X packets.

12. The hardware emulation system of claim 11, wherein the first component is a USB3 media access controller.

13. The hardware emulation system of claim 12, wherein the second component is a USB3 link controller.

14. The system of claim 10, wherein the USB4 controller comprises a Peripheral Component Interconnect Express (PCIe) controller.

15. The system of claim 10, wherein the instruction further causes the processor to:
set the configuration register to a second value;
cause a second data stored in the first section of the first memory to be forwarded to a physical access layer (PHY) of the USB4 controller;
return data from the PHY for storage in the second section of the memory;
compare the second data to the data returned from the PHY and stored in the second section of the memory; and
verify the test if the second data matches the data returned from the PHY.

16. The system of claim 10, wherein the instructions further cause the processor to:
set a direction bit of a packet represented by the first data to a first logic level; and
set a direction bit of a packet represented by the second data to a second logic level.

17. A non-transitory computer readable medium comprising stored instructions, which when executed by a processor, cause the processor to:
set a configuration register disposed in a USB4 controller to a first value;
cause a first data stored in a first section of a memory associated with the USB4 controller to be forwarded and pass through at least a first component of the USB4 controller and a second component of the USB4 controller, in sequence, in response to the first value;
return data received by the second component, via the first component, for storage in a second section of the memory;
compare the first data to the data returned and stored in the second section of the memory; and
verify the test if the first data matches the return data.

18. The non-transitory computer readable medium of claim 17, wherein the USB4 controller is one or more of a USB4 host controller and a USB4 device controller.

19. The non-transitory computer readable medium of claim 17, wherein the USB4 controller is configured to process both USB3 generation T packets and USB3 generation X packets.

20. The non-transitory computer readable medium of claim 19, wherein the instructions further cause the processor:
set a direction bit of a packet represented by the first data to a first logic level; and
set a direction bit of a packet represented by the returned data to a second logic level.

* * * * *